United States Patent

Relles

[15] 3,700,743
[45] Oct. 24, 1972

[54] CONVERSION OF DIACETYLBENZENES TO UNSATURATED DERIVATIVES

[72] Inventor: Howard M. Relles, Rexford, N.Y.

[73] Assignee: General Electric Company

[22] Filed: Aug. 26, 1970

[21] Appl. No.: 67,212

[52] U.S. Cl. .............................. 260/668 R, 260/599
[51] Int. Cl. .............................................. C07c 15/04
[58] Field of Search .......................... 260/668 R, 599

[56] References Cited

UNITED STATES PATENTS 3,129,243    4/1964    Hubel ....................... 260/668

*Primary Examiner*—Curtis R. Davis
*Attorney*—James W. Underwood, Richard R. Brainard, Joseph T. Cohen, Charles T. Watts, Paul A. Frank, Frank L. Neuhauser, Oscar B. Waddell and Joseph B. Forman

[57] ABSTRACT

The use of a solvent mixture consisting essentially of from 30–70 volume percent dichloromethane with the balance being chloroform, has a profound beneficial effect on the yield of the $\beta, \beta'$-dichlorobenzenediacrolein obtained by reaction of the complex of phosgene and N,N-dimethyl-formamide with m- or p-diacetylbenzene. The diacrolein products are readily converted to the corresponding diethynylbenzenes which are useful in the making of acetylenic polymers and copolymers.

6 Claims, No Drawings

CONVERSION OF DIACETYLBENZENES TO UNSATURATED DERIVATIVES

The invention relates to an improvement wherein a mixture of dichloromethane and chloroform is used as the solvent in the process for converting diacetylbenzenes to their corresponding $\beta,\beta'$-dichlorobenzenediacroleins by reaction with the complex of phosgene and N,N-dimethylformamide. More particularly, this invention relates to an improvement wherein a solvent mixture, consisting essentially of from 30 – 70 volume percent dichloromethane, the balance being chloroform, is used in the process wherein the complex of phosgene and N,N-dimethylformamide (hereinafter designated as phosgene-dimethylformamide complex) is reacted with m-diacetylbenzene, p-diacetylbenzene or mixtures thereof to produce $\beta,\beta'$-dichloro-m-benzenediacrolein, $\beta,\beta'$diclhoro-p-benzenediacrolein, or mixtures thereof. These diacrolein products are readily converted to the corresponding diethynyl-benzenes with an aqueous alkali metal hydroxide. unacceptable.

Polymeric acetylenes and the process for producing the same are disclosed in U. S. Pat. No. 3,300,456 — Allan S. Hay. The polymers from diethynylbenzenes are an extremely interesting group of polymers since they contain over 90 percent be weight carbon. Furthermore, the diethynylbenzenes are useful in making photosensitive compositions, as disclosed and claimed in the copending application of Allan S. Hay Ser. No. 764,287, now U.S. Pat. No. 3,594,175, filed Oct. 1, 1968 and assigned to the same assignee as the present invention.

Because of the wide utility for the polyacetylenic polymers as disclosed in the aforementioned patents it would be highly desirable to have an economical process for producing the diethynylbenzenes required as starting materials for the polymers. Arnold et al, Coll. Czech. Chem. Comm. 24, 2385 (1959); 26, 2852 (1961) and Proc. Chem. Soc., 7, 227 (1958); discussed the various reactions of carbonyl compounds with the complex of either phosphorus oxychloride or phosgene with N,N-dimethyl-formamide to form a quaternary salt which upon hydrolysis in basic solution produces the $\beta$-chloroacrylaldehyde derivative according to the following equation

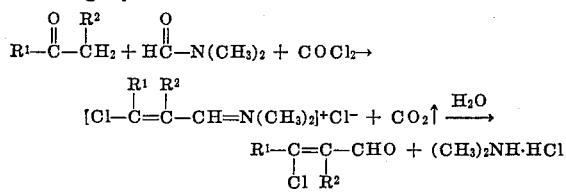

Dialkyl ketones can react with more than one mole of the complex but an aryl alkyl keton such as acetophenone can only react with one mole. Bodendorf et al, Angew, Chem. (Internat. Edit) 2, 98 (1963) describes reactions of the phosphorus oxychloride-dimethylformamide complex with various acetophenones to produce the corresponding $\beta$-chlorocinnamaldehydes which in the presence of alkali gave the corresponding phenylacetylene. German Pat. No. 1,213,830 describes the reaction of these complexes with diacetyl-benzenes to produce $\beta,\beta'$-dichlorobenzenediacroleins, but does not describe whether or not such compounds can be hydrolyzed to the corresponding diethynylbenzenes.

Unfortunately, the yield of the $\beta$-chloroacrolein derivatives of the ketones is in the range of 50 – 80 percent. It would be highly desirable to increase the yield, especially of the $\beta, \beta'$-dichlorobenzenediacroleins and convert them, if possible, to their corresponding diethynylbenzenes to provide a convenient and economical source of these starting materials for the polyacetylenic polymers. I have now discovered, that yields of greater than 90 percent and conversions of greater than 95 percent, based on the diacetylbenzene consumed can be obtained if the reaction is carried out in a mixture of solvents consisting essentially of from 30 – 70 volume percent dichloromethane, the balance being chloroform. Still further improvements are made in the yield, if, when hydrolyzing the quaternary salt, the reaction mixture of the diacetylbenzene and phosgene-dimethylformamide complex is added to an aqueous solution of a salt of a strong base and weak acid, for example, sodium acetate, potassium acetate, sodium bicarbonate, potassium bicarbonate, etc. The salt solution should not be poured into the reaction mixture unless it can be done almost instantaneously and with exceptionally good stirring. I have further found that the $\beta,\beta'$-dichlorobenzenediacroleins are easily and readily hydrolyzed with aqueous alkali metal hydroxide solutions to produce diethynylbenzenes in high yields. Because of the excellent yields I obtain in making the diacroleins and the excellent yields on hydrolysis, the overall conversion of diacetylbenzenes to diethynylbenzenes is exceptionally high making this a very attractive process for making diethynylbenzenes.

Although the dimethylformamide-phosgene complex can be preformed by bubbling phosgene into a solution of the dimethylformamide and then adding the diacetylbenzene, the latter can be present to simplify the procedure, since phosgene does not react with the acetyl group at room temperature. THe phosgene reacts with the dimethylformamide to produce carbon dioxide and the complex. The amount of phosgene that has to be added is easily monitored by following the evolution of carbon dioxide from the reaction mixture or it can be readily monitored by use of a flowmeter, noting the increase in weight of the reaction mixture or the decrease in weight of the phosgene cylinder, etc.

One mole of phosgene reacts with one mole of dimethylformamide to form one mole of the phosgene-dimethylformamide complex and one mole of carbon dioxide. Theoretically, only one mole of the complex is required for each acetyl group. However, I have found that a much faster reaction is obtained if an additional mole of the complex is used. In contrast to the very fast reaction of the phosgene with the dimethylformamide, the reaction of the phosgene-dimethylformamide complex with the diacetylbenzene is relatively slow at room temperature but still proceeds fast enough that it is essentially complete at room temperature in about 12 hours. The reaction is easily monitored by nmr spectroscopy by noting the decrease of the acetyl group. If desired, the reaction can be speeded by heating up to the reflux temperature of the mixture.

The phosgene-dimethylformamide complex is very insoluble in dichloromethane but very soluble in chloroform. The quaternary salt intermediate products from the reaction of the complex with the diacetylbenzene are quite soluble in dichloromethane but relatively much less soluble in chloroform. Although I do not want to be limited by my theory, I believe that my high yields over that of the prior art result because the mixed solvent maintains a homogeneous solution for a much longer period of time. The optimum ratio would be equal volumes of dichloromethane and chloroform in the solvent composition. However, amounts as low as 30 volume percent dichloromethane up to as high as 70 volume percent dichloromethane, the balance being chloroform, can be used with very effective results in increasing the yield of the reaction products. Even using a solvent mixture of equal parts by volume of dichloromethane and chloroform will still result in precipitation of some quaternary salt intermediate product prior to completion of the reaction. After completion of the reaction, any excess phosgene is preferably removed, for example, with a current of dry gas or by refluxing, permitting recovery of phosgene.

In the absence of a salt of a strong base and a weak acid during the aqueous hydrolysis of the quaternary salt to the diacrolein product, the mixture becomes sufficiently acidic to hydrolyze some of the diacrolein to an undesirable ketonic byproduct. The same objectionable hydrolysis reaction will occur in strongly basic solution. Therefore, it is undesirable to use a strongly basic solution to neutralize the acid formed in he hydrolysis step. By use of a salt of a strong base and a weak acid whose aqueous solution is not strongly basic, for example the alkali metal salts of alkanoic acids or bicarbonates, the hydrolysis of the quaternary salt is maintained essentially neutral and minimizes any hydrolysis to undesirable byproducts. As mentioned previously it is preferable to add the reaction mixture to a well stirred aqueous solution of the salt of a strong base and a weak acid. Because they are readily available and low in cost, the preferred salt is sodium acetate or sodium bicarbonate. During the hydrolysis reaction, the reaction mixture, which is added as a slurry, becomes a clear organic layer. It is separated from the aqueous layer, washed with water and dried. Removal of the solvent leaves the desired $\beta,\beta'$-dichlorobenzenediacrolein as a white crystalline solid which can be further purified if desired by recrystallization.

The diacrolein product is readily converted to the desired diethynylbenzene by reaction with an alkaline aqueous solution preferably an aqueous solution of an alkali metal hydroxide, for example sodium hydroxide, potassium hydroxide, lithium hydroxide, rubidium hydroxide, cesium hydroxide, etc. Because of its cheapness and ready availability, sodium hydroxide is preferred. The reaction will proceed at room temperature but is greatly hastened by heating in the temperature range of 50° C. up to the reflux temperature. The reaction is greatly hastened by using a solvent combination in which both the alkali and the chlorinated diacrolein are soluble. A mixture of dioxane and water is ideal for this purpose.

The diethynylbenzene is isolated by adding additional water and chloroform to the reaction mixture, acidifying with hydrochloric acid, and separating the chloroform solution which is washed with water to remove traces of dioxane and dried with a desiccant, for example, anhydrous magnesium sulphate. The diethynylbenzene is isolated by evaporation of the chloroform.

In order that those skilled in the art may better understand my invention, the following examples are given by way of illustration and not by way of limitation.

EXAMPLE 1

A solution of 8.11 g. of m-diacetylbenzene and 14.62 g. of N,N-dimethylformamide in 50 ml. of dichloromethane and 50 ml. of chloroform was put in a 300 ml. round-bottomed flask, cooled with a cold water bath and equipped with a stirrer, thermometer, and a reflux condenser having a drying tube at the top. Phosgene was introduced at a relatively slow rate for the first 8 minutes during which time an exothermic reaction with vigorous evolution of carbon dioxide occurred. The flow rate of the phosgene was increased to approximately four grams per minute during the next 7 minutes by which time the evolution of carbon dioxide had become very slow indicating essentially complete conversion of the dimethylformamide to the dimethylformamide0phosgene from complex The flow of phosgene was stopped and the reaction allowed to proceed at ambient temperature.

In five minutes the solution was turbid and in 2½ hours a precipitate had formed in such large quantity that the solution was very stiff and hard to stir. An additional 50 ml. of chloroform and 50 ml. of dichloromethane was added and the reaction allowed to proceed at ambient temperature for an additional 13 hours. Under vigorous stirring to insure a representative sample, a sample was withdrawn and hydrolyzed with an excess of 20 percent by weight aqueous sodium acetate solution, the organic layer separated, washed well with water and dried. At this point, analysis by vapor phase chromatography showed the reaction mixture to be 96 percent $\beta,\beta'$-dichlorobenzenediacrolein and 4 percent diacetylbenzene. After an additional 25 hours reaction, analysis by vapor phase chromatography of a sample taken as described above showed no evidence of the presence of diacetylbenzene.

The excess phosgene and solvent were removed with a stream of dry nitrogen passing through the reaction mixture overnight. The solid residue was slurried with 100 ml. of chloroform and added to 250 g. of a 20 percent by weight aqueous sodium acetate solution with rapid stirring which caused all of the solid to disappear leaving two liquid phases. The organic phase was washed with three 100 ml. portions of water and dried over anhydrous magnesium sulphate. After filtering the drying agent from the solution, the solvent was evaporated under vacuum leaving 12.46 g. of a white solid which is 97.5 percent of theory for $\beta,\beta'$-dichloro-m-benzenediacrolein. This product was analyzed by nmr spectroscopy and vapor phase chromatography and found to be greater than 90 percent pure. It was further purified by recrystallization from acetone.

When Example 1 is repeated but p-diacetylbenzene is used in place of the m-diacetylbenzene, the product is $\beta,\beta'$-dichloro-p-benzenediacrolein.

EXAMPLE 2

A solution of 0.50 g. of $\beta,\beta'$-dichloro-m-benzenediacrolein from Example 1 in 10 ml. of dioxane was added dropwise during 10 minutes to 10 ml. of a 10 percent aqueous solution of sodium hydroxide and 10 ml. of dioxane at 80°–82° C. with rapid stirring. After refluxing for 25 minutes, the reaction mixture was added to 100 ml. of water and 100 ml. of chloroform and the aqueous layer acidified with 2.5 ml. of concentrated aqueous hydrochloric acid. After vigorous shaking, the chloroform layer was separated and dried over anhydrous magnesium sulphate. Analysis of the solution by vapor phase chromatography showed that the product was greater than 98 percent m-diethynylbenzene with less than 2 percent of two unidentified impurities. The m-diethynyl-benzene was separated form the solvents by careful evaporation of the solvents under vacuum care being taken to prevent loss of the m-diethynylbenzene which has a relatively high vapor pressure at room temperature. Alternatively, the m-diethynylbenzene can be separated by fractional distillation, care being taken to prevent polymerization of the product.

When Example 2 is repeated but $\beta,\beta'$-dichloro-p-benzenediacrolein is used in place of the $\beta,\beta'$-dichloro-m-benzenediacrolein, the product is p-diethynylbenzene.

As will be readily apparent to those skilled in the art, mixtures of the various diacetylbenzenes can be converted into the corresponding $\beta,\beta'$-dichlorobenzenediacroleins and these diacroleins can be converted into the corresponding diethynylbenzenes. Although the above examples have illustrated the preferred embodiments of my invention, various modifications within the scope of the invention will be readily apparent to those skilled in the art and are within the scope of the invention as defined in the appended claims.

What I desire to secure by Letters Patent of the United States is:

1. In the process of making $\beta,\beta'$-dichloro-m-benzenediacrolein, $\beta,\beta'$-dichloro-p-benzenediacrolein or mixtures thereof by reacting m-diacetylbenzene, p-diacetyl-benzene or mixtures thereof with the complex of phosgene and N,N-dimethylformamide, the improvement wherein the reaction is carried out in a solvent mixture consisting essentially of from 30 – 70 volume percent dichloromethane, the balance being chloroform.

2. The process of making m-diethynylbenzene, p-diethynylbenzene or mixtures thereof which comprises making $\beta,\beta'$-dichloro-m-benzenediacrolein, $\beta,\beta'$-dichloro-p-benzenediacrolein or mixtures thereof by the process of claim 1 and thereafter reacting said benzenediacrolein with an aqueous alkali metal hydroxide to convert it to the corresponding diethynylbenzene.

3. The process of claim 1 wherein $\beta,\beta'$-dichloro-m-benzenediacrolein is made from m-diacetylbenzene.

4. The process of claim 1 wherein $\beta,\beta'$-dichloro-p-benzenediacrolein is made form p-diacetylbenzene.

5. A process of claim 2 wherein m-diethynylbenzene is made from m-diacetylbenzene.

6. The process of claim 2 wherein p-diethynylbenzene is made from p-diacetylbenzene.

* * * * *